United States Patent
Sahraei

(10) Patent No.: US 10,942,773 B1
(45) Date of Patent: Mar. 9, 2021

(54) ENSEMBLE EVENT SCHEDULING BY EXECUTING A PLURALITY OF SCHEDULERS HAVING A PROBABILISTIC DISTRIBUTION OF TICKS TO ENSURE A TICK WITHIN A THRESHOLD TIME

(71) Applicant: Amazon Technologies, Inc., Seattle, WA (US)

(72) Inventor: Alireza Sahraei, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 145 days.

(21) Appl. No.: 16/192,516

(22) Filed: Nov. 15, 2018

(51) Int. Cl.
*G06F 9/48* (2006.01)
*G06F 9/54* (2006.01)
*H04L 12/26* (2006.01)

(52) U.S. Cl.
CPC ............ *G06F 9/4887* (2013.01); *G06F 9/542* (2013.01); *H04L 43/087* (2013.01)

(58) Field of Classification Search
None
See application file for complete search history.

(56) References Cited

U.S. PATENT DOCUMENTS

| | | | |
|---|---|---|---|
| 2010/0043000 A1* | 2/2010 | Chrysanthakopoulos | ................... G06F 9/4887 718/102 |
| 2013/0067484 A1* | 3/2013 | Sonoda | ................. G06F 9/4818 718/103 |
| 2015/0074673 A1* | 3/2015 | Tohzaka | .................... G06F 9/46 718/103 |
| 2015/0110019 A1* | 4/2015 | Sun | ..................... H04W 72/048 370/329 |

* cited by examiner

*Primary Examiner* — Bradley A Teets
*Assistant Examiner* — Michael W Ayers
(74) *Attorney, Agent, or Firm* — Lee & Hayes, P.C.

(57) ABSTRACT

This disclosure describes techniques implemented by an event scheduling system for using an ensemble of event schedulers to achieve higher precision when generating a tick at a desired time at which an event is scheduled to occur. Event scheduling systems that schedule events at scale may utilize event schedulers that have relatively low precision in order to provide the scheduling services at scale. By utilizing an ensemble, or group, of event schedulers to generate a tick at a particular time for a scheduled event, the ticks generated by the ensemble of event schedulers may be distributed throughout jitter delay such that likelihood that one of the ticks is close to the scheduled time for the event is increased. Thus, the techniques described herein may provide higher precision scheduling techniques for use by event scheduling systems.

18 Claims, 10 Drawing Sheets

ENSEMBLE EVENT SCHEDULING BY EXECUTING A PLURALITY OF SCHEDULERS HAVING A PROBABILISTIC DISTRIBUTION OF TICKS TO ENSURE A TICK WITHIN A THRESHOLD TIME

BACKGROUND

Service providers offer cloud-based services to fulfill users' computing-service needs without the users having to invest in and maintain computing infrastructure required to implement the services. These service providers may operate service provider networks that include network-based computing resources and functionality to implement various types of services, such as scalable-storage services, computer-processing services, application-platform services, and so forth. However, when large amounts of resources are utilized by users, manually managing the resources (e.g., collecting data, detecting state changes, etc.) can become labor and resource intensive.

To automate management of these services, the service provider networks may provide event scheduling systems that schedule events at scale, such as by scheduling events to manage geographically disparate computing resources. Due to the large scale at which events are scheduled, the event scheduling systems may provide lower precision event scheduling that experience jitter in the schedule ticks to provide scheduling systems at scale to conserve processing power. While low precision event scheduling may be sufficient for some event management operations, some users may desire more granular and precise scheduling for managing events.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
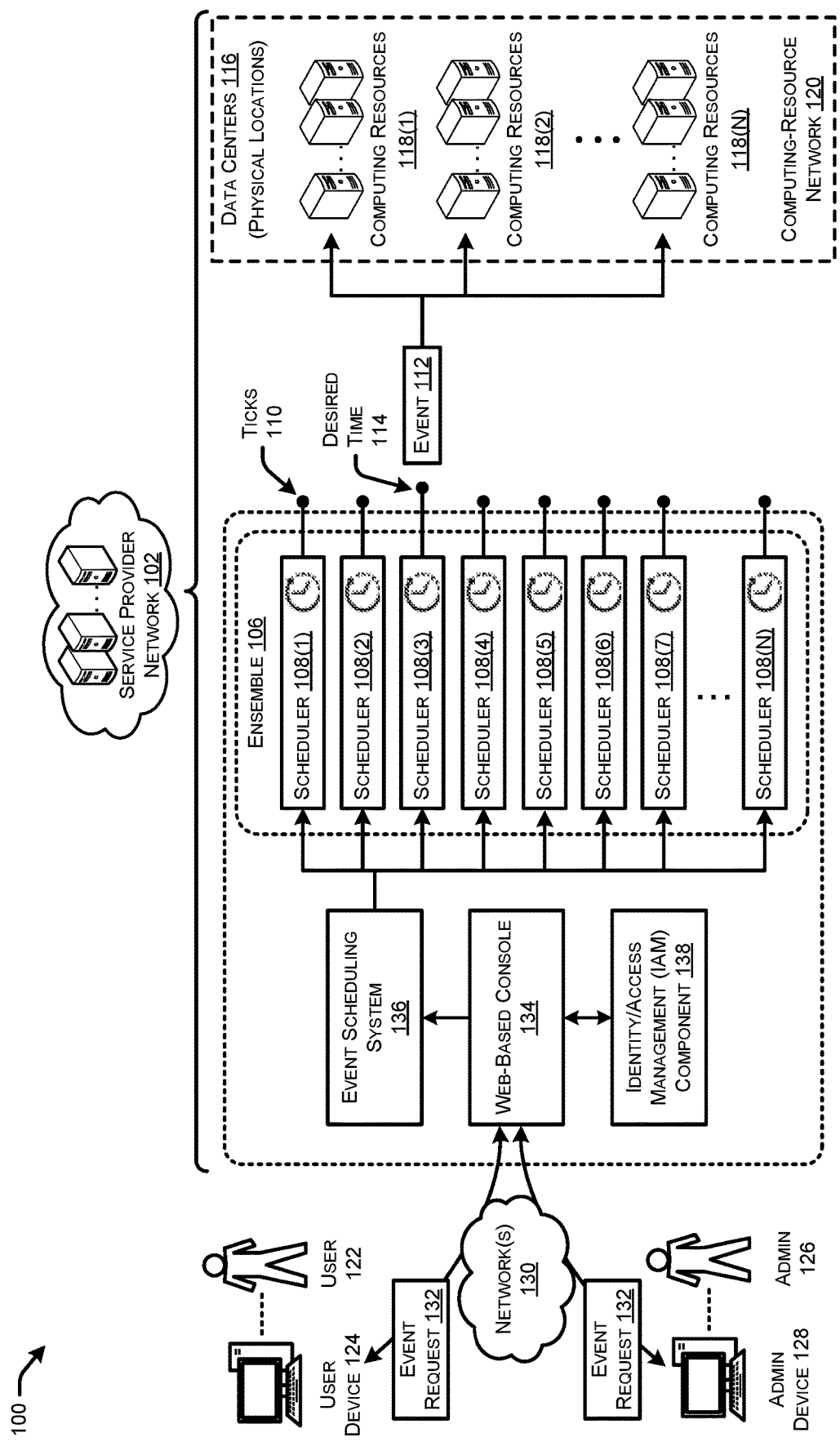
FIG. 1 illustrates a system-architecture diagram of an example environment in which an event scheduling system of a service provider network utilizes an ensemble of event schedulers to generate a tick to cause an event to occur at a desired time.

This disclosure describes, at least in part, techniques implemented by an event scheduling system for using an ensemble of event schedulers to achieve higher precision when generating a tick at a desired time at which an event is scheduled to occur. Event scheduling systems that schedule events at scale may utilize event schedulers that have relatively low precision in order to provide the scheduling services at scale while maintaining lower processing power costs. For instance, an event scheduling system may schedule events with event schedulers that have minute level precision, or that generate ticks within a minute of the scheduled time. By utilizing an ensemble, or group, of event schedulers to generate a tick at a particular time for a scheduled event, the ticks generated by the ensemble of event schedulers may be distributed throughout the jitter delay such that likelihood that one of the ticks is close to the scheduled time for the event is increased. Thus, the techniques described herein may provide higher precision scheduling techniques for use by event scheduling systems.

Generally, users of a service provider network may desire to automate the management of the cloud-based services that are provided by the service provider network. For example, users may need to periodically, and according to a schedule, collect data from resources in the service provider network for various purposes. As an example, a particular user may enroll for use of a code-execution service provided by the service provider network, and may desire to periodically have code execute at scale to collect time-sensitive sensor data from sensors that monitor commercial properties managed by the user. For instance, the user may wish to schedule an event for code to execute at scale to poll sensor data from smoke detectors, carbon monoxide sensors, etc., at the residential properties after furnaces or other heating systems power up. In such examples, the user may wish to have this sensor data collected with greater granularity or precision than that provided by traditional event schedulers that execute at scale.

For instance, event scheduling systems may utilize event schedulers to generate ticks to cause events to occur. The event schedulers may be scheduled to generate a tick at a desired time, but due to jitter (e.g., the latency between the scheduled tick and the generation of the tick), the event schedulers may lack precision or granularity in that the tick may not be generated exactly at the desired time. For example, an event scheduler may have jitter of approximately 60 seconds, meaning that the event scheduler may actually generate a tick to cause an event to occur within 60 seconds of the scheduled time. In this way, event schedulers may only have granularity of 60 seconds to scheduling events due to jitter because the event scheduler may not actually generate a tick until 60 seconds after the desired time.

In the example where event schedulers experience 60 seconds of jitter, the event scheduling system may allow users to schedule events at 60 second increments to ensure that the event schedulers have enough time to generate a tick in light of the jitter. Thus, a user may be able to schedule events at 60 seconds, 120 seconds, 180 seconds, and so forth. The event schedulers may generate ticks throughout the 60 seconds according to different distributions. For instance, the event schedulers may generate ticks throughout the 60 seconds at uniform distribution such that the event scheduler is as likely to generate a tick at the beginning of the 60 seconds as it is at the end of the 60 seconds. Accordingly, event scheduling systems may provide users with event scheduling services that provide for 60 seconds of precision or granularity due to jitter in the event schedulers.

However, as noted above, certain users may desire to have more granularity or precision for causing events to occur than 60 seconds. For instance, a user may desire to have a high level of confidence that an event will be triggered by a tick within 6 seconds of the desired time. For instance, a user may request that an event be triggered at a desired time at 140 seconds. Traditionally, the event scheduling system may schedule an event scheduler to tick at 120 seconds due to the 60 increments at which the event schedulers may be scheduled. However, due to 60 second jitter experienced by the event scheduler, the actual tick may be generated anywhere from −20 seconds to +40 seconds of the desired time at 140 seconds. Thus, event scheduling systems may be unable to provide the granularity or precision of 6 seconds from the desired time for causing an event to occur.

According to the techniques described herein, an event scheduling system may utilize an ensemble, or group, of event schedulers in coordination to increase the precision or granularity at which the event scheduling system can cause events to occur. Rather than scheduling a single event scheduler to generate a tick at the 120 second increment just prior to the desired time of 140 seconds, and having the single event scheduler generate a tick within the following 60 seconds of jitter (e.g., anywhere from −20 seconds to +40 seconds from the desired time at 140 seconds), an ensemble of event schedulers may be scheduled to generate respective ticks at the 120 second increment to increase the likelihood that one event scheduler in the ensemble generates a tick within the 6 seconds that is desired by the user. For instance, the event schedulers may, in some examples, generate ticks within the 60 seconds of jitter with uniform distribution, or substantially uniform distribution. Thus, the higher the number of event schedulers included in the ensemble, the higher the confidence that a tick generated by one of the schedulers in the ensemble will be within the 6 seconds that is desired by the user.

Accordingly, the techniques described herein include calculating a number of event schedulers to utilize in an ensemble, and scheduling the ensemble of event schedulers to tick at a same increment. In this way, the probability that one of the event schedulers generates a tick at the desired time within the 60 seconds of jitter is increased. The techniques may include defining the desired time for an ensemble of event schedulers for a particular user. Further, the event scheduling system may include a component to detect when one of the event schedulers generated a tick within a threshold period of time from the desired time. Upon detecting the tick within the threshold period of time from the desired time, the event scheduling system may write the desired time to a distributed storage atomically such that the ticks generated by event schedulers subsequent the selected tick fail to write to memory. In this way, the event scheduling system may more precisely cause events to occur at desired, or scheduled, times by utilizing an ensemble of event schedulers.

The techniques described herein improve the functioning, efficiency, precision, and/or granularity for event scheduling systems. Traditional event scheduling systems have been limited in how precise they are able to perform event scheduling, particularly for scheduling events at scale in networks of resources (e.g., cloud-based resource networks). For instance, event scheduling systems may utilize low precision event schedulers that have low cost and processing requirements to achieve high precision scheduling of events for users. In this way, the event scheduling systems may increase the performance and ability for users to manage their services. Additionally, the more precise and granular event scheduling may allow for users to automate the management of services that require high precision than previously obtainable. While high precision scheduling techniques can be performed on single computing machines, users of cloud-based services that operate at scale have previously been unable to obtain precise scheduling of events. Accordingly, the techniques described herein target a computer-based solution to a computer-based problem rooted in network technology.

While the techniques described in this application are with reference to specific numbers and time frames, the techniques are equally applicable to any type of event schedule, and for any granularity in scheduling of events. Additionally, the threshold periods of time, jitter time, and other numbers used herein are merely for explanatory purposes, and the techniques are applicable for any environment, time frame, or implementation.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an event scheduling system 104 of a service provider network 102 utilizes an ensemble 106 of event schedulers 108 to generate ticks 110 to cause an event 112 to occur at a desired time 114.

In some examples, the service provider network 102 may include data centers 116 located across different geographic areas or regions. Each of the data centers 116 may include respective computing resources 118 that are part of a total computing-resource network 120 at the different physical locations of the data centers 116 to support various cloud-based services. Examples of the cloud-based services that the computing resources 118 in each data center 116 may individually, or as a computing-resource network 120, support may include an on-demand computing service, a message-queuing service, a managed-database service, a software-execution service, and/or other services. The on-demand computing service may be a collection of computing resources configured to instantiate VM instances and to provide other types of computing resources on demand. For example, a customer or other user of the service provider network 102 may interact with the on-demand computing service (via appropriately configured and authenticated API calls) to provision and operate VM instances that are instantiated on physical computing devices hosted and operated by the service provider network 102. The VM instances may be used for various purposes, such as to operate as servers supporting a web site, to operate business applications or, generally, to serve as computing resources for the customer. Other applications for the VM instances may be to support database applications, electronic commerce applications, business applications and/or other applications.

The message-queuing service maybe a managed message queuing service that enables users to send, store, and receive messages between software components at any volume without losing messages or requiring that other services be available. The message-queuing service may include different types of message queues to users. The managed-database service may comprise a nonrelational database that delivers reliable performance at any scale and is fully managed, multi-region, multi-master database that provides consistent low latency, and offers built-in security, backup and restore, and in-memory caching. The managed-database service may be a collection of computing resources that collectively operate to create, maintain, and allow queries to be performed on databases stored within the service provider network 102. For example, a customer or other user of the service provider network 102 may operate and manage a database from the database service by utilizing appropriately configured network API calls. This, in turn, may allow the customer to maintain and potentially scale the operations in the database. The software-execution service may provide users with a serverless compute service that runs code in response to triggers and manages the underlying compute resources for users. Users can utilize the software-execution service to extend other services with custom logic, or back-end services that operate at service provider network 102 scale, performance, and security. However, other services may be supported by the computing resources 118 of the service provider network 102.

Accordingly, the service provider network 102 may comprise clusters of managed servers stored in data centers located across geographic areas. The service provider network 102 may be a distributed network through which users 122 (often customers) may interact via user devices 124 to manage or otherwise interact with a service provided by the service provider network 102. Similarly, administrators 126 (or "admins") of the service provider network 102 may utilize admin deices 128 to manage or otherwise interact with a service provided by the service provider network 102. The users 122 may comprise one or more of individual users, groups of users, organizations, businesses, or other entities that interact with the service provider network 102 via respective user devices 124. The user devices 124 and/or admin devices 128 may be any type of computing device capable of connecting to the service provider network 102 via a suitable data communications network 130 such as, but not limited to, a laptop or desktop computer, a tablet computing device, a server computer, or a mobile telephone. Administrative users 126 employed by the operator of the service provider network 102, such as administrators managing the operation of the service provider network 102, might also connect with, manage, and utilize resources provided by the service provider network 102 in a similar fashion.

For instance, users 122 and/or admins 126 may submit one or more event requests 132 over the network(s) 130, and via a web-based console 134, to request that an event be scheduled to manage the services supported by the computing resources 118. The web-based console 134 may comprise any type of web-accessible location by which event requests 132 can be submitted, such as an API, a user interface presented in a website, a command-line interface (CLI), and/or any other interface by which a user device 124 and/or admin device 128 may submits an event request 132 to the service provider network 102.

In some examples, the service provider network 102 may include an identity and access management (IAM) component 138 to allow users to manage access to their network-based services and resources securely. As illustrated, the user 122 (and/or admin 126) may utilize a user device 124 to create one or more accounts utilizing an interface (e.g., web-based console 134) exposed by the IAM component 138 (or another component). The IAM component 138 may provide credentials for logging into the user account for the user 122. The IAM component 138 may restrict what users 122 are able to perform management functions for the services, such as submitting event requests 132, and/or what types of event requests 132 particular users 122 may submit.

Upon receiving the event request 132, the web-based console 134 may route or otherwise provide an indication of the request 132 to an event scheduling system 136. The event request 132 may indicate various information, such as an event that the user 122 and/or admin 126 is requesting, a time (or schedule of times) at which the event is to occur, the service(s) or computing resources 118 for which the event is to be performed, a single-use or periodicity indication for the event 112, and/or other information for scheduling the event 112. Upon receiving the event request 132 and associated information, the event scheduling system 136 may determine the ensemble 106 of event schedulers 108. Generally, the event schedulers 108 may comprise any event scheduler known in the art for generating tick, such as a system tick that operating system timers and delayer are based on. The system tick may correspond to the event 112 to cause a task, workflow, or other process to occur. Thus, the schedulers 108 may generate a tick 110 that causes an event 112 to occur, such as causing a workflow process for managing the computing resources 118. Such workflows may be adding a resource 118 (and/or instance supported by the services 118), removing a resource 118, modifying a resource, and/or any other workflow process for resources and/or instances that support cloud-based services.

The event scheduling system 136 may utilize the ensemble 106, or group, of event schedulers 108 in coordination to increase the precision or granularity at which the event scheduling system 136 can cause events 112 to occur. For instance, the event schedulers 108 may, in some examples, generate ticks 110 within 60 seconds of jitter with uniform distribution, or substantially uniform distribution. Thus, the higher the number of event schedulers 108 included in the ensemble, the higher the confidence that a tick 110 generated by one of the schedulers 108 in the ensemble 106 will be within 6 seconds that is desired by the user 122.

Thus, the event scheduling system 136 may determine or calculate a number of schedulers 108 to include in the ensemble 106 to achieve higher precision that one of the ticks 110 will occur at, or within a threshold period of time, from the desired time 114. In some examples, the number of schedulers 108 included in the ensemble 106 may be determined based on various factors, such as how large or small the threshold period of time from the desired time 114 the user 122 would like to have the event 112 occur, and/or a confidence that the user 122 would like to have that the tick 110 be within the threshold period of time. Generally, the more precision, and the higher confidence, requested by the user 122 may cause the event scheduling system 136 to include a higher number of schedulers 108 in the ensemble 106. The user 122 and/or admin 126 may define the confidence/probability value as well as the threshold period of time for generate a tick 110 at or near the desired time 114.

For instance, an event scheduler may generally execute at a time prior to the desired time 114 such that a tick 110 is generated according to a uniform distribution within the delay due to jitter. In such examples, the probability that an event 112 from a single event scheduler 108 is not scheduled within 6 seconds of the desired time 114 is 0.9 because it follows a uniform distribution. More specifically, there is a 10% change that a single scheduler 108 generate a tick within the 6 seconds from the desired time 114. Accordingly, because the event schedulers 108 generate ticks 110 independently, the probability that no tick 110 is generated within 6 seconds of the desired time 114 from N event schedulers 108 equals to $0.9^N$, hence, the probability that at least one tick 110 occurs within 6 seconds of the desired time 114 is $1-0.9^N$. The figure and table in FIGS. 3A and 3B illustrate the relationship between the number of schedulers 108 "N" and the confidence level of generating an event within 6 seconds. However, the threshold period of time may vary, and the equation may be equally applied to schedulers 108 that generate ticks 110 in a non-equally distributed manner.

In this way, the event scheduling system 136 may determine a number of schedulers 108 to be included in the ensemble 106 based at least in part on the threshold period of time and the desired, requested, or defined confidence/probability values. Upon determining the number of schedulers 108(N) where "N" is any integer of 2 or greater, the event scheduling system 136 may schedule the ensemble 106 of schedulers 108 to execute at a particular time prior to the desired time, and/or at multiple times according to a schedule defined/determined by the user 122 and/or admin 126. Generally, the schedulers 108 may comprise any type of software scheduler, firmware scheduler, hardware scheduler, and/or any combination thereof. For instance, the schedulers may be based on OS timers the ticks 110 may be system ticks from the OS.

At the scheduled times, the schedulers 108 in the ensemble 106 may execute to generate ticks 110 in a uniform distribution within the jitter (e.g., 60 second delay after the scheduled time). The scheduling system may include code or components configured to monitor the ticks 110 to detect a tick 110 that is within the threshold period of time from the desired time 114. For instance, the event scheduling system 136 may determine a time for each of the ticks 110. If the time for a tick 110 is greater than, or equal to, the desired time 114 minus the threshold period of time, then the event scheduling system 136 may cause the event 112 to occur. For example, if the desired time 114 is 140 seconds, threshold period of time if 6 seconds, and a selected tick 110 is 142 seconds, the event scheduling component may determine that the tick time of 142 seconds is greater than or equal to the desired time of 140 seconds and less than 140 seconds plus the 6 seconds, or 146 seconds. In such examples, the event scheduling system 136 may cause the event 112 to occur. Further, the event scheduling system 136 may write the desired time 110, i.e. 140 seconds, to a distributed storage location atomically such that subsequent ticks 110 from event schedulers 108 do not cause the event 112 to occur as they are unable to be written to the storage location, or memory.

The event 112 may occur by, for example, executing code to perform one or more operations, or workflows, for adding, removing, modifying, or otherwise managing the computing resources 118. For instance, the event 112 may include collecting data from the computing resources 118, checking the state of different computing resources 118, and/or performing any type of operation known in the art for managing the services described herein, and/or any other services not described herein that may be supported by distributed computing resources 118.

Figure 2:
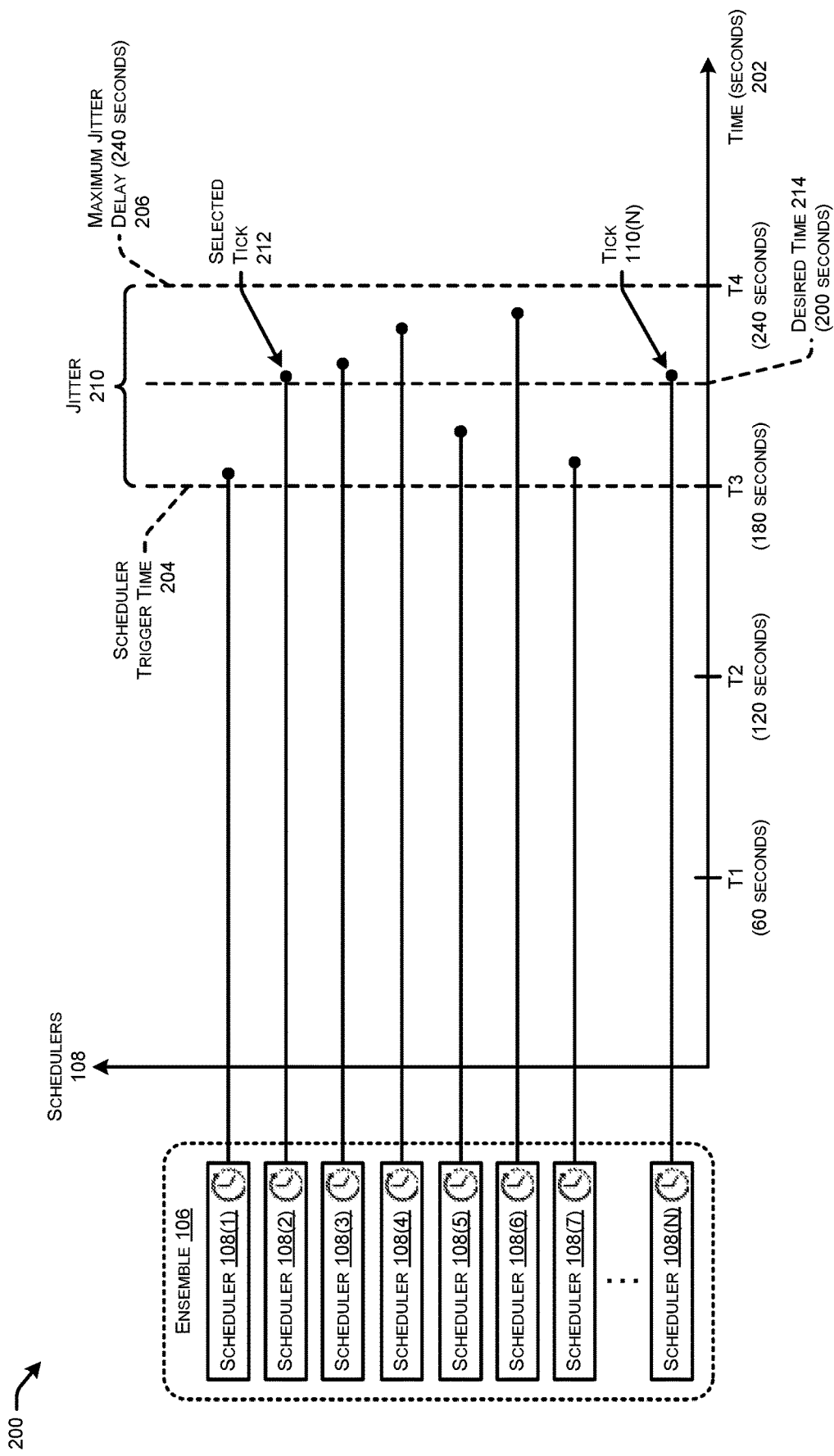
FIG. 2 illustrates an example graph illustrating a distribution of ticks by an ensemble of event schedulers within a jitter delay period.

FIG. 2 illustrates an example graph 200 illustrating a distribution of ticks 110 by an ensemble 106 of event schedulers 108 within a jitter delay period.

Generally, the graph 200 may illustrate the distribution of the schedulers 108 on the y-axis versus the time 202 on the x-axis at which the schedulers generate ticks 110. As illustrated, the schedulers 108 in the ensemble 106 may be scheduled to generate a tick 110 at a scheduler trigger time 204 of 180 seconds. Thus, the schedulers 108 execute at 180 seconds as scheduled to generate ticks 110. However, due to jitter with the schedulers 108, the actual ticks 110 may not be generated until a subsequent time within the maximum jitter delay 206 of 240 seconds at T4 caused by the jitter 208 (e.g., 60 seconds of jitter). However, these time periods are merely illustrative and any time values are applicable for the techniques described herein. Although the jitter 210 is illustrated as being a time period after the scheduler trigger time 204, in some examples, the jitter 210 may also be entirely before, or overlapping before and after the scheduler trigger time 204 depending on the schedulers 108.

As illustrated, the schedulers 108 may generate respective ticks 110 according to a distribution (uniform or non-uniform) after the scheduler trigger time 204, and during the jitter 210. Once the scheduler trigger time 204 has approached at T3 (180 seconds), the schedulers 108 may execute to begin generating ticks 110 within the jitter 210 time. The user 122, admin 126, and/or other process may provide the event scheduling system 136 with an indication of the desired time 214, in this example at 200 seconds. The event scheduling system 136 may include code configured to select a tick 110 that is generated within a threshold period of time from the desired time 214. For instance, to determine a selected tick 212, the event scheduling system 136 may include code similar to the following snippet of pseudo code:

desired_time=200
precision=6
event_handler (event):
current_time=system_time.get_time( )
if       (current_time>=desired_time     and current_time<desired_time+precision):
   Write desired_time to a distributed storage atomically or fail if already exists The above pseudo code is merely an example, but illustrates how the event scheduling system 136 may identify and select a tick 212 that is within the desired precision time or granularity, such as 6 seconds. Once the desired time is (as part of selecting tick 212) is written to storage/memory atomically, subsequent ticks may fail from being written to the storage/memory, or are otherwise rejected. For instance, tick 110(N) may be within the threshold period of time, or precision, but may not be used to generate an event 112 due to the selected tick 212 being written to memory atomically.

FIG. 3A illustrates an example graph 300 representing probabilities 304 on the y-axis, and ticks 306 on the x-axis. The graph 300 has a probability curve 308 plotted thereon that represents the probability that an event occurs within a threshold time from a desired time based on the number of event schedulers 108 included in an ensemble 106 generating ticks 110.

As illustrated, the probability curve 208 may generally follow a logarithmic-like curve that approaches 1.0, or a 100% chance that the event occurs within the threshold time from a desired time based on the number of ticks 306 being generated by the ensemble 106 of schedulers 108. The illustrates probability curve 308 is representative of schedulers 108 that generate ticks according to a uniform distribution. Further, the probability curve 308 illustrates the probability (P), based on the number of ticks (N), that a tick (or event) occurs within a threshold period of time of 6 seconds from the desired time. Thus, the threshold period of time is a range of 6 seconds, or $\frac{1}{10}^{th}$ of a minute, resulting in the probability of 0.9 that a single scheduler 108 generates a tick within the 6 second range at a uniform distribution in the 60 second jitter. Thus, the probability curve 308 that represents the probability (P) as a function of ticks (N) according to a uniform distribution is $P=0.9^N$ under uniform distribution of tick generation within the jitter. As illustrates, for a specific point 310 along the curve 308, the probability that a tick is generated within 6 seconds from the desired time using an ensemble of N=22 schedulers 108 may be 90.2%.

However, the graph 300 in FIG. 3A is merely illustrative of specific threshold period of time and jitter time periods. The techniques are generally applicable to any threshold period of time from a desired time, and/or any jitter periods. Further, the probability curve 308 is for uniform distribution, but the techniques are equally applicable for non-uniform distribution of ticks being generated by the schedulers 108. To determine the distribution that models how schedulers 108 generate ticks in a non-uniform matter, the schedulers 108 may be tested to determine a distribution value or function that is representative of the non-uniform distribution.

FIG. 3B illustrates an example table 312 illustrating confidence levels 314 that a tick 316 occurs within a threshold period of time from a desired time based on the number of event schedulers in an ensemble generating ticks.

Similar to the graph of FIG. 3A, the confidence levels are illustrative of schedulers that generate ticks according to a uniform distribution, and according to the probability curve 308 modeled by the equation $P=0.9^N$ based on the threshold period of time and jitter time. As illustrated, if the number of ticks (N) 316 generated by an ensemble 106 is 17, the confidence value 314 that a tick is generated within the threshold period of time from the desired time is 83.3%. as the number of ticks 316 increase, the confidence levels 314 increase in a logarithmic manner. In some examples, users 124 and/or admins 126 may provide input, or otherwise specify, desired confidence levels 314 that a tick 316 is generated within the threshold period of time to determine how many schedulers 108 are to be included in an ensemble 106. In this way, users 124 and/or admins 126 may control how certain, or confident, they would like for events to occur based on the service for which the ticks 316 are being generated.

Figure 3:
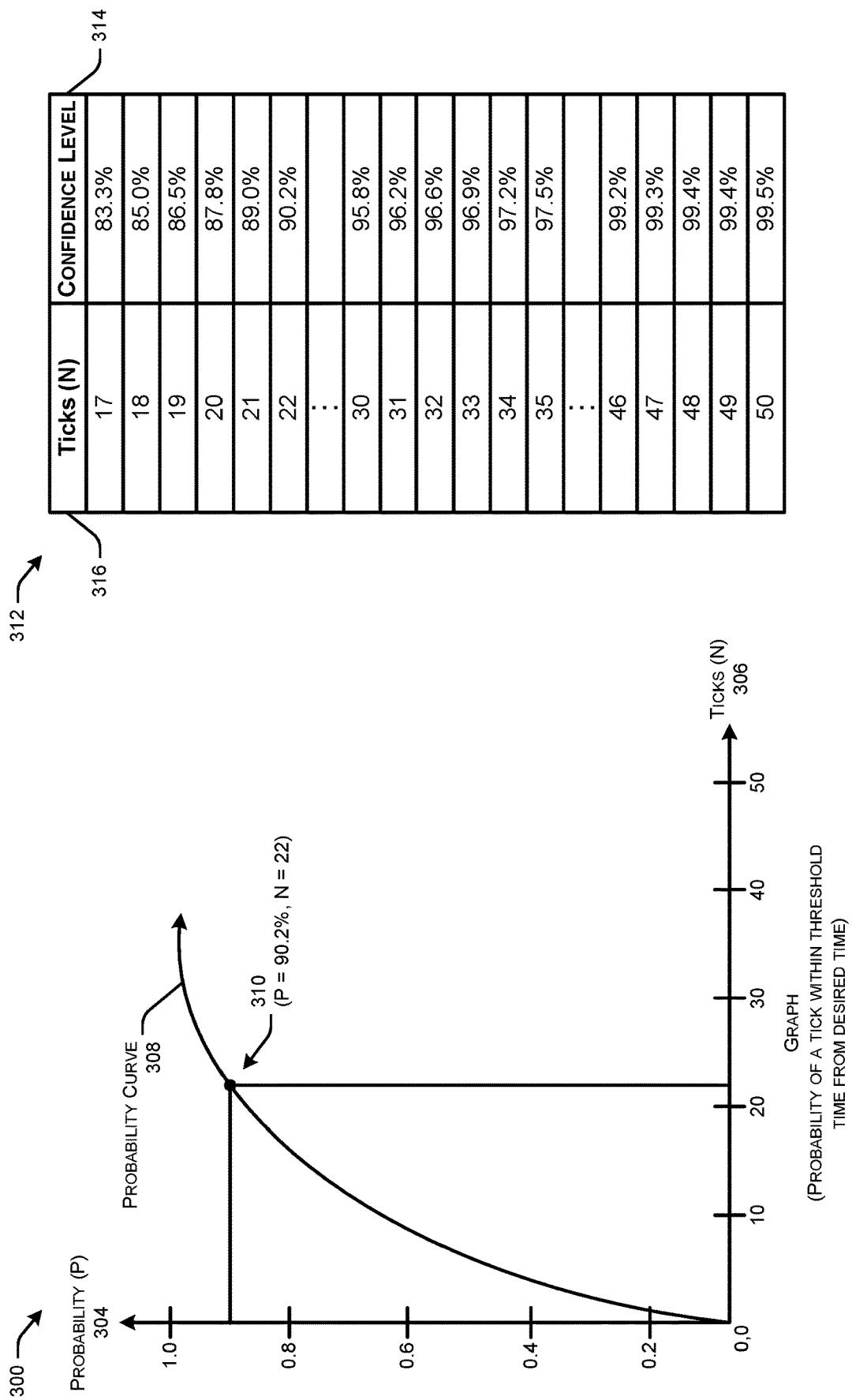
FIG. 3A illustrates an example graph illustrating probabilities that an event occurs within a threshold time from a desired time based on the number of event schedulers included in an ensemble generating ticks.
FIG. 3B illustrates an example table illustrating confidence levels that a tick occurs within a threshold period of time from a desired time based on the number of event schedulers in an ensemble generating ticks.
Figure 4:
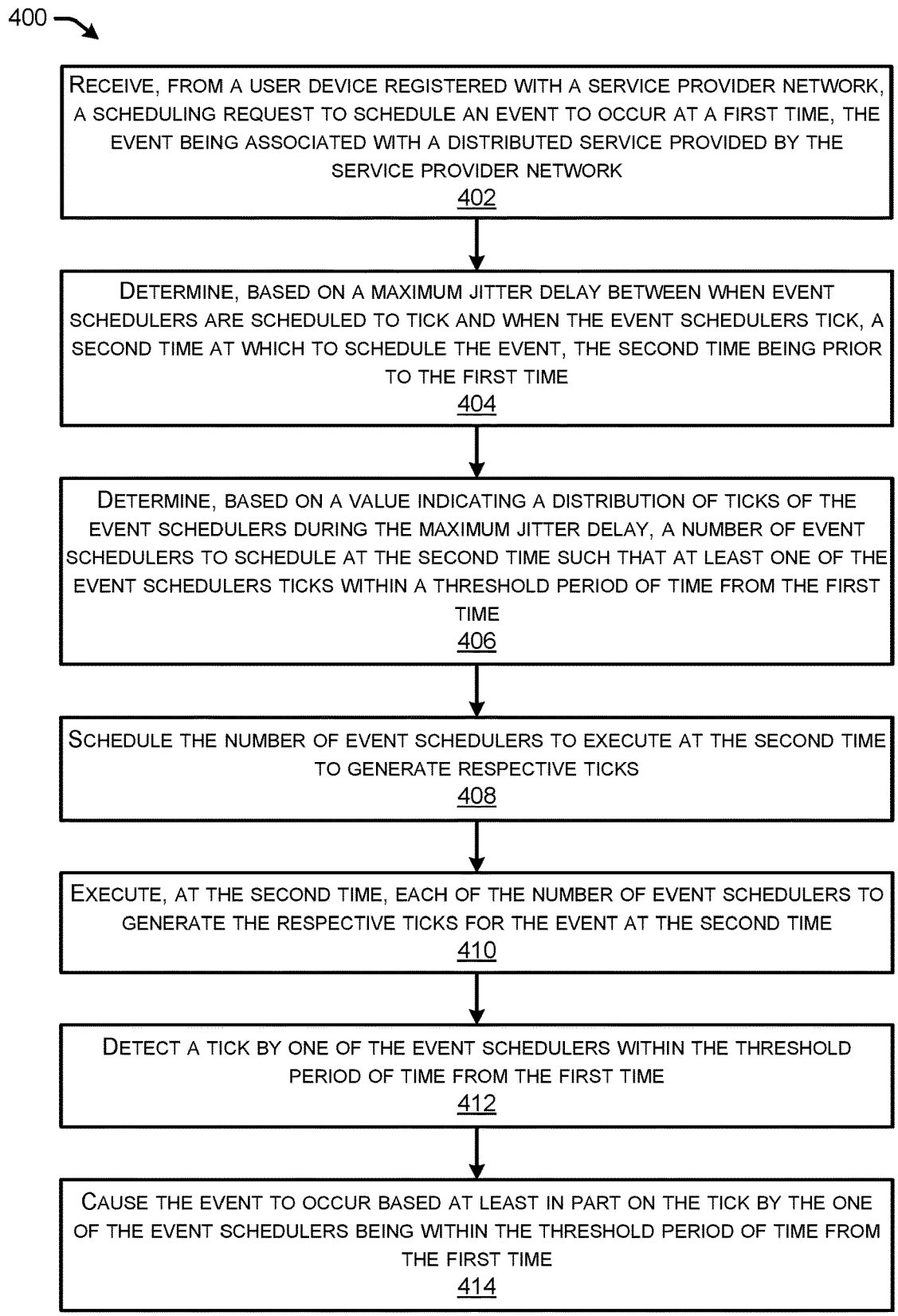
FIG. 4 illustrates a flow diagram of an example method for receiving a request to schedule an event to occur, and determining a number of event schedulers to generate ticks for the scheduled event.
Figure 5:
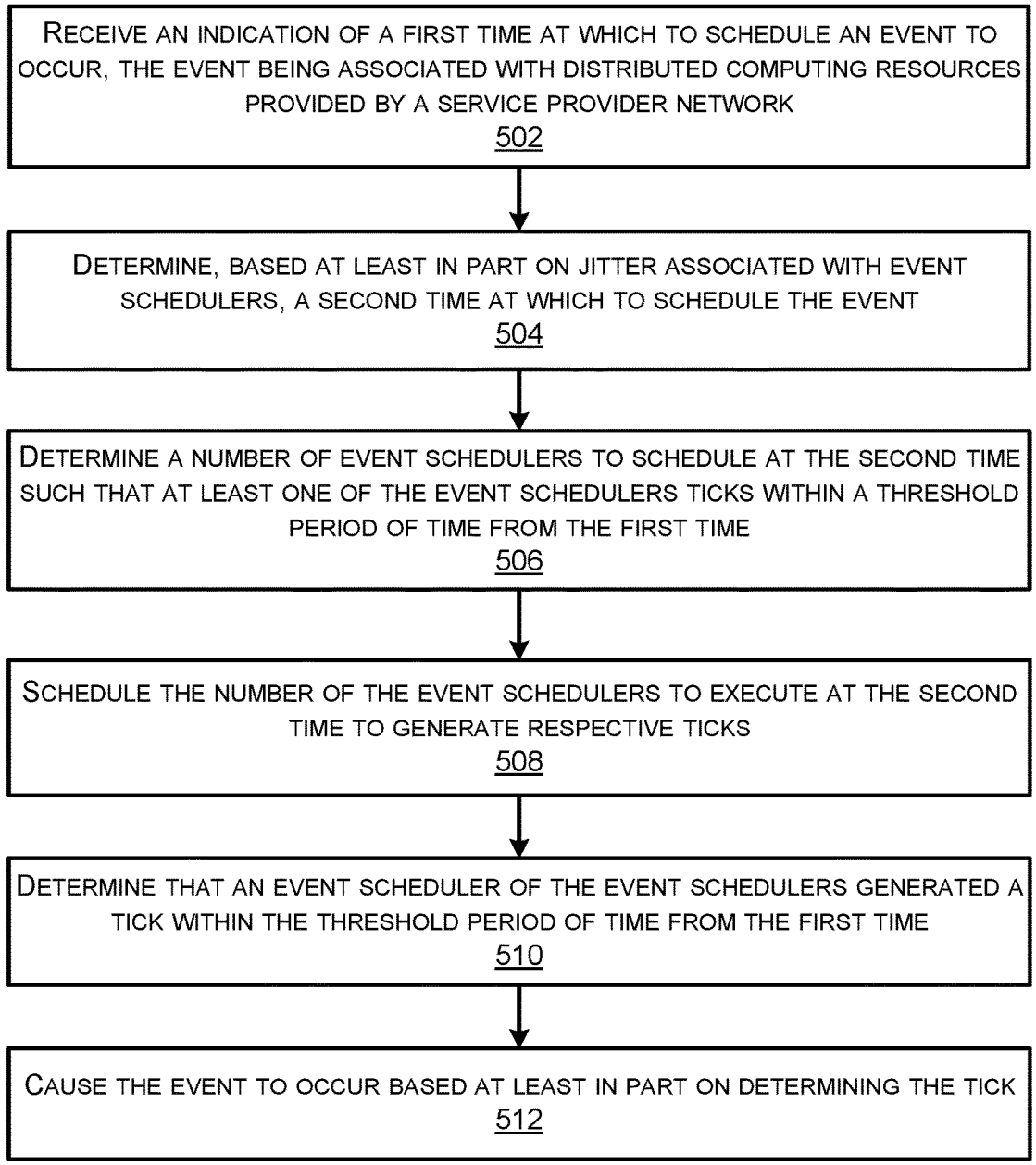
FIG. 5 illustrates a flow diagram of another example method for determining a number of event schedulers to generate ticks for a scheduled event.
Figure 6:
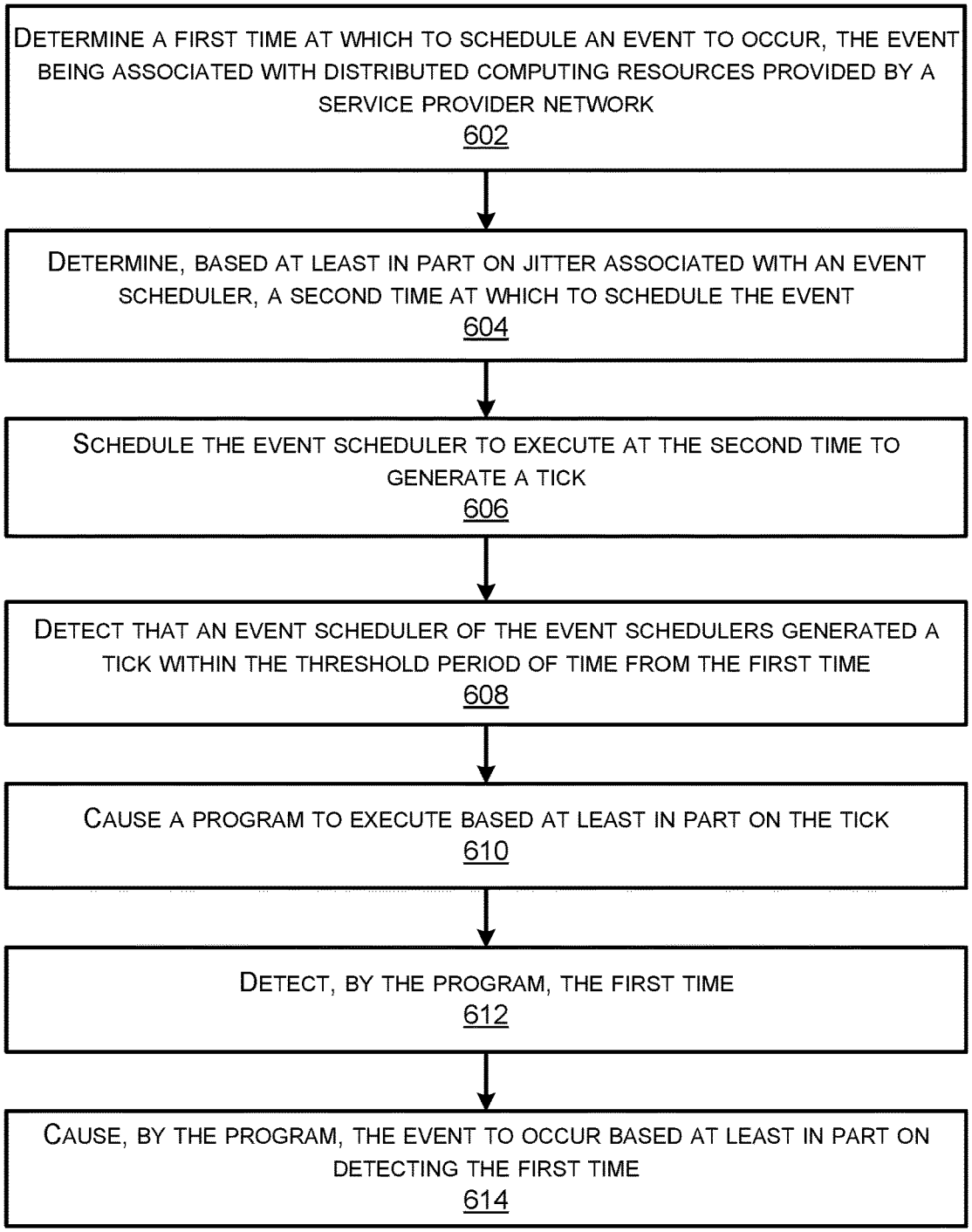
FIG. 6 illustrates a flow diagram of an example method for causing a program to execute after an event scheduler generates at tick, and having the program cause a scheduled event to occur at a desired time.

FIGS. 4-6 illustrate flow diagrams of example methods 400, 500, and 600 that illustrate aspects of the functions performed at least partly by the service provider network 102 as described in FIGS. 1-3. The logical operations described herein with respect to FIGS. 4-6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4-6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for receiving a request to schedule an event to occur, and determining a number of event schedulers to generate ticks for the scheduled event.

At 402, a service provider network 102 may receive, from a user device registered with the service provider network 102, a scheduling request to schedule an event to occur at a first time, the event being associated with management of a distributed service provided by the service provider network. For instance, the user device 124, and/or admin device 128, may send a request 132 to the service provider network 102. The request may include various information, such as an event that the user 122 and/or admin 126 is requesting, a time (or schedule of times) at which the event is to occur, the service(s) or computing resources 118 for which the event is to be performed, a single-use or periodicity indication for the event 112, and/or other information for scheduling the event 112.

At 404, the service provider network 102 may determine, based on a maximum jitter delay between when event schedulers are scheduled to tick and when the event schedulers tick, a second time at which to schedule the event schedulers to execute, the second time being prior to the first time. In examples where the jitter causes the event schedulers 108 to generate ticks after the scheduler trigger time 204, the service provider network 102 may determine the second time at which to schedule the event schedulers 108 to execute at a time prior to the first time, such as at an incremental time based on the maximum jitter delay 206 (e.g., at T1, T2, T3, and/or T4 illustrated in FIG. 2).

At 406, the service provider network 102 may determine, based on a value indicating a distribution of ticks of the event schedulers during the maximum jitter delay, a number of event schedulers to schedule at the second time such that at least one of the event schedulers ticks within a threshold period of time from the first time. The value indicating the distribution of ticks of the event schedulers 108 may indicate that the schedulers 108 generate ticks according to a uniform distribution, or according to a non-uniform distribution. Depending on the distribution, the service provider network 102 may determine how many event schedulers 108 to include in an ensemble 106 for generate ticks 110 such that at least one of the event schedulers 108 ticks within the threshold period of time from the desired time for the event 112.

At 408, the service provider network 102 may schedule the number of event schedulers to execute at the second time to generate respective ticks. In some examples, the event schedulers 108 may be scheduled to execute to generate an event 112 one time, or periodically. At 410, the service provider network 102 may execute, at the second time, each of the number of event schedulers to generate the respective ticks for the event at the second time. For instance, the service provider network 102 may include one or more processors that execute each of the event schedulers at the second time to generate respective ticks within the jitter delay time period.

At 412, the service provider network 102 may detect a tick by one of the event schedulers within the threshold period of time from the first time. For example, event scheduling system 136 may utilize the pseudo code, and/or other code, to detect a tick 110 within a threshold period of time from the desired time 114 for the event 112. At 414, the service provider network 102 may cause the event to occur based at least in part on the tick by the one of the event schedulers being within the threshold period of time from the first time. For example, the service provider network 102 may cause a workflow (or process) to be performed to add, remove, modify, and/or otherwise manage computing resources 118 and/or services of the service provider network 102.

FIG. 5 illustrates a flow diagram of another example method 500 for determining a number of event schedulers to generate ticks for a scheduled event.

At 502, the service provider network 102 may receive an indication of a first time at which to schedule an event to occur, the event being associated with distributed computing resources provided by a service provider network 102. For instance, the service provider network 102 may receive the indication of the first time from a user device 124, and/or an admin device 128, as part of an event request 132. In some examples, the indication may be received from other workflows, services, and/or processes that are associated with the service provider network 102.

At 504, the service provider network 102 may determine, based at least in part on jitter associated with event schedulers, a second time at which to schedule the event schedulers to execute. For instance, the jitter may cause the service provider network 102 to schedule the schedulers 108 to execute at predefined periods of time that are at least the length of the jitter according to which the schedulers 108 generate ticks 110.

At 506, the service provider network 102 may determine a number of event schedulers to schedule at the second time such that at least one of the event schedulers ticks within a threshold period of time from the first time. For instance, depending on whether the schedulers generate ticks in a uniform or non-uniform distribution within the jitter, on the threshold period of time, and/or on confidence levels that the ticks are generated within the threshold period of time, the service provider network 102 may determine how many schedulers 108 to include in an ensemble 106.

At 508, the service provider network 102 may schedule the number of the event schedulers to execute at the second time to generate respective ticks. At 510, the service provider network 102 may determine that an event scheduler of the event schedulers generated a tick within the threshold period of time from the first time. At 512, the service provider network 102 may cause the event to occur based at least in part on the tick. For instance, the service provider network 102 may execute a workflow (or process) to perform operations associated with distributed resources and/or services of the service provider network 102.

FIG. 6 illustrates a flow diagram of an example method 600 for causing a program to execute after an event scheduler generates at tick, and having the program cause a scheduled event to occur at a desired time.

At 602, a service provider network 102 may determine a first time at which to schedule an event to occur, the event being associated with managing distributed computing resources provided by a service provider network. In some examples, the service provide network 102 may determine the first time by receiving a request 132 from a user device 124, an admin device 128, and/or from a process, that indicates the first time.

At 604, the service provider network 102 may determine, based at least in part on jitter associated with an event scheduler, a second time at which to schedule the event. At 606, the service provider network 102 may schedule the event scheduler to execute at the second time to generate a tick.

At 608, the service provider network 102 may detect that an event scheduler of the event schedulers generated a tick within the threshold period of time from the first time. At 610, the service provider network 102 may cause a program to execute based at least in part on the tick.

At 612, the service provider network 102 may detect, by the program, the first time. At 614, the service provider network 102 may cause, by the program, the event to occur based at least in part on detecting the first time.

Figure 7:
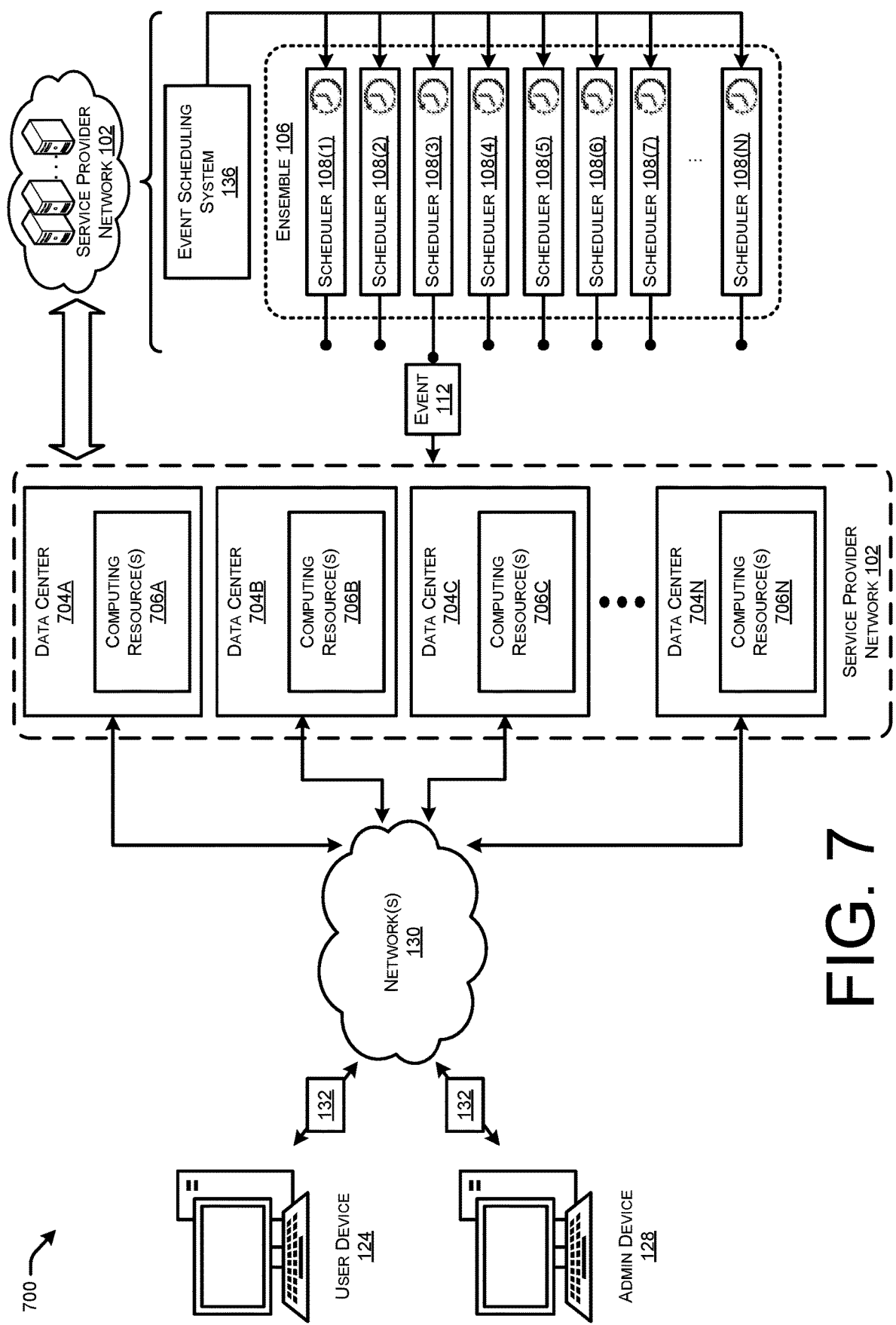
FIG. 7 illustrates a system and network diagram that shows an illustrative operating environment that includes a service provider network that can be configured to implement aspects of the functionality described herein.

FIG. 7 is a system and network diagram that shows an illustrative operating environment 700 that includes a service-provider network 102 (that may be part of or associated with a cloud-based service network/platform) that can be configured to implement aspects of the functionality described herein.

The service-provider network 102 can provide computing resources 706, like VM instances and storage, on a permanent or an as-needed basis. Among other types of functionality, the computing resources 706 provided by the service-provider network 102 may be utilized to implement the various cloud-based services. The computing resources provided by the service-provider network 102 can include various types of computing resources, such as data processing resources like VM instances, data storage resources, networking resources, data communication resources, application-container/hosting services, network services, and the like.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 102 can also be configured to provide other types of computing resources not mentioned specifically herein.

The computing resources 706 provided by the service-provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the service-provider network 102. For example, one or more data centers 704 may be included in or otherwise make-up an availability zone. Further, one or more availability zones may make-up or be included in a region. Thus, the service-provider network 102 may comprise one or more availability zones, one or more regions, and so forth. The regions may be based on geographic areas, such as being located within a predetermined geographic perimeter.

The users and/or admins of the service-provider network 102 may access the computing resources 706 provided by the data centers 704 of the service-provider network 102 over any wired and/or wireless network(s) 130 (utilizing a user device 124 and/or another accessing-user device 128), which can be a wide area communication network ("WAN"), such as the Internet, an intranet or an Internet service provider ("ISP") network or a combination of such networks. For example, and without limitation, a device operated by a user of the service-provider network 102 may be utilized to access the service-provider network 102 by way of the network(s) 130. It should be appreciated that a local-area network ("LAN"), the Internet, or any other networking topology known in the art that connects the data centers 704 to remote clients and other users can be utilized. It should also be appreciated that combinations of such networks can also be utilized.

In a distributed computing environment, such as the one included in the service provider network 102 (e.g., computing-resource network 120), a fleet of VM instances and/or servers may have workflow or processes executed thereon to manage resources. For instance, a patch may need to be installed on each VM instance and/or resource at a particular time. In such distributed applications of workflows or processes, a load balance may be at the front end in front of the fleet of servers where a request for a workflow comes in, and the load balancer distributes the request to execute the workflow amongst the servers. In some examples, the event scheduling system 136 and ensemble 106 may be located before the load balancer such that, when the selected tick 212 is identified for the event 112 at the desired time 114, the tick 212 and/or event 112 may be provided to the load balancer at the desired time 114. The load balancer may then distribute the event 112 or workflow amongst the servers. In some instances, the load balancing server may receive all of the ticks 110 from the ensemble 106 of schedulers 108 and include logic (e.g., pseudo code described with reference to FIG. 2) for detecting the tick 110 at the desired time 114, or within a threshold period of time from the desired time 114 at which the event 112 is scheduled to occur. Once the load balancing server has detected the tick, the load balancing server may determine the event 112 and distribute instructions to execute a workflow and/or process to the appropriate servers in the service provider network 102.

Figure 8:
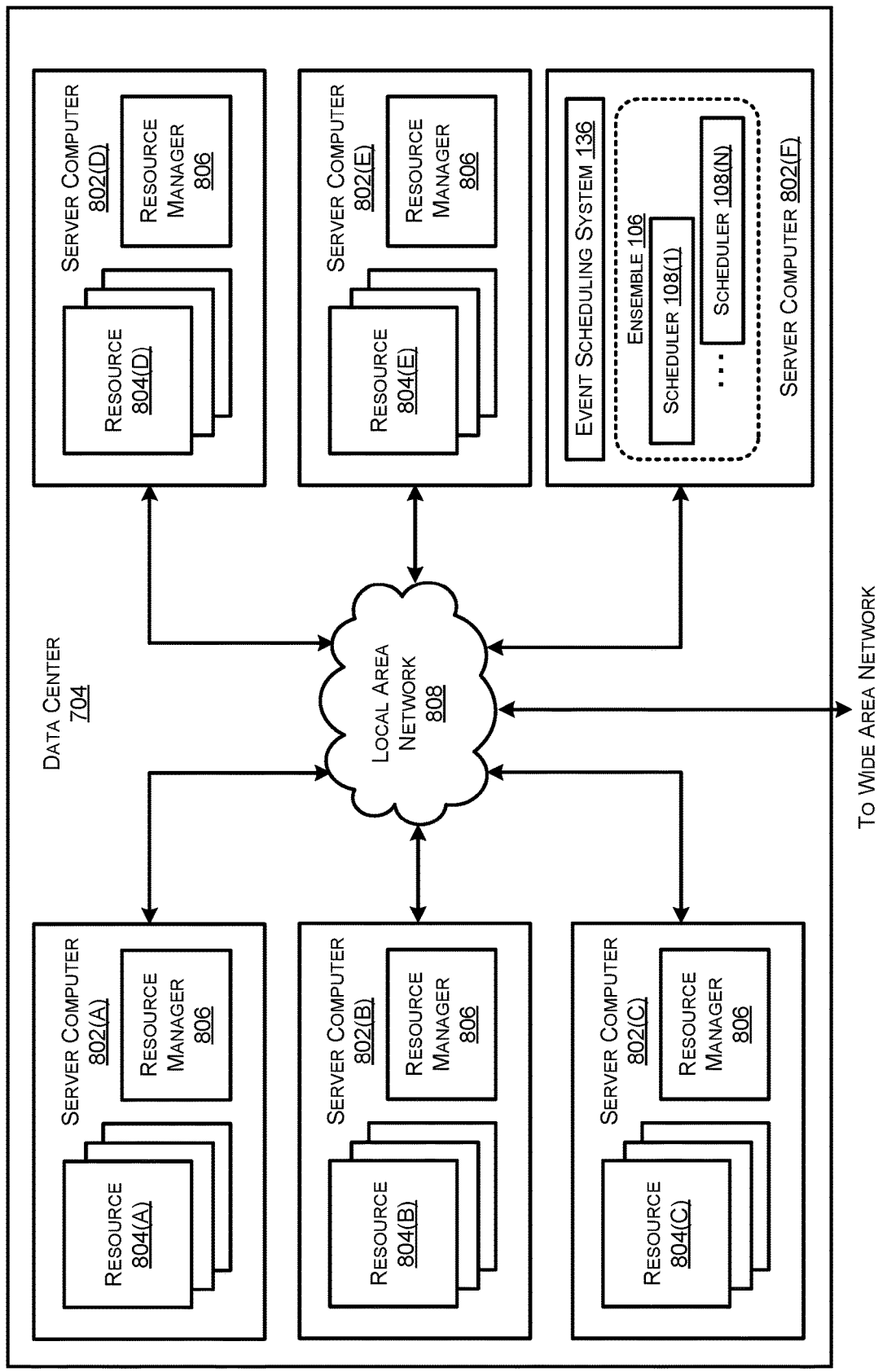
FIG. 8 illustrates a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E. In some examples, the resources 804 may include, or correspond to, the computing resources 118 described herein (e.g., virtual machines executing on the server computers 802).

The server computers 802 can be standard tower, rack-mount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute components of the service provider network 102, including the event scheduling system 136, the ensemble 106 including schedulers 108(1)-108(N) where "N" is any integer of 2 or greater, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 804 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

In some examples, the server computer 802(F) may include the event scheduling system 136 and the ensemble 106 of event schedulers 108. In such examples, the ensemble 102 of schedulers 108 may execute on the server computer 802(F), and the event scheduling system 136 may detect a tick generated by one of the schedulers 108 that is within the threshold period of time or precision from the desired time, and cause an event to occur, such as having each of the server computers 802 in the data center 704 perform a workflow or execute a process. Accordingly, the techniques described herein may be implemented in a data center 704 of distributed computers 802 or servers, in desired examples.

Figure 9:
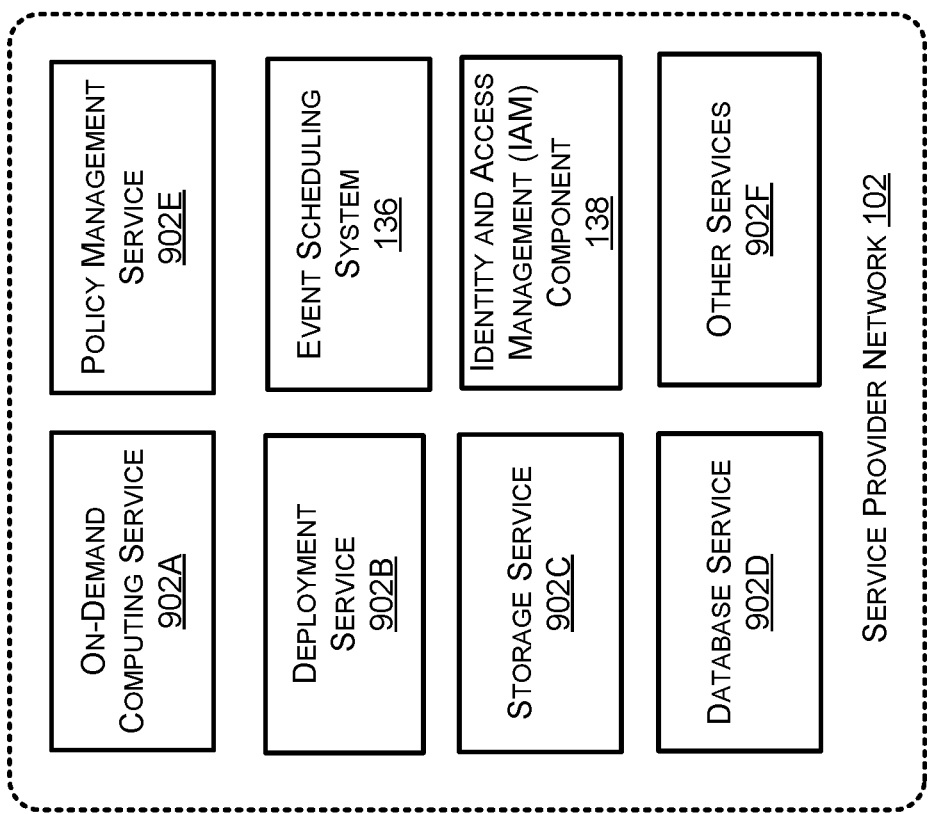
FIG. 9 is a system and network diagram that shows aspects of several services that can be provided by and utilized within a service provider network in one configuration disclosed herein.

FIG. 9 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102, and can be managed according to the techniques described herein for generating events 112. The service provider network 102 can provide various types of services including, but not limited to, an on-demand computing service 902A, a deployment service 902B, a storage service 902C, a database service 902D, and/or a policy management service 902E, some of which are described in greater detail below. Additionally, the service provider network 102 can also provide other services 902F, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 130 shown in FIG. 7. Communications from a customer computing device, such as the computing devices 124 and 128 shown in FIG. 7, to the service provider network 102 can cause the services provided by the service provider network 102 to operate in accordance with the described configurations or variations thereof. Additionally, events 112 scheduled for a particular time, and performed based on a tick 110, can cause workflows to be performed on the services provided by or supported by the service provider network 102, as shown in FIG. 7.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service). Additional details regarding some of the services shown in FIG. 9 will now be provided.

As discussed above, the on-demand computing service 902A can be a collection of computing resources configured to instantiate VM instances and to provide other types of computing resources on demand. For example, a customer or other user of the service provider network 102 can interact with the on-demand computing service 902A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 102, such as a computer system or computer system service that does not employ virtualization and instead provisions computing resources on dedicated or shared computers/servers and/or other physical devices.

A storage service 902C can include software and computing resources that collectively operate to store data using block or file-level storage devices (and/or virtualizations thereof). The storage devices of the storage service 902C can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a database service 902D that may provide non-relational databases to users that deliver performance at any scale. The database service 902D may provide databases that are fully managed, multi-region, multi-master databases that provide low latency, and offers built-in security, backup and restore, and in-memory caching. The database service 902D may be utilized for various use cases, such as serverless web applications, microservices data store, mobile backends, gaming applications, IoT data management, and so forth.

The service provider network 102 can also include a cryptography service (e.g., other services 902F). The cryptography service 902F can utilize storage services of the service provider network 102, such as the storage service 902C, to store encryption keys in encrypted form, whereby the keys are usable to decrypt customer keys accessible only to particular devices of the cryptography service 902F. The cryptography service 902F can also provide other types of functionality not specifically mentioned herein.

Additionally, the service provider network 102, in various embodiments, also includes an authentication service (e.g., other services 902F) and a policy management service 902E. The authentication service 902F, in one example, is a computer system (i.e., collection of computing resources) configured to perform operations involved in authentication of users. For instance, one of the services 902 shown in FIG. 9 can provide information from a user to the authentication service 902F to receive information in return that indicates whether or not the requests submitted by the user are authentic. In some examples, the authentication service 902F may include, correspond to, interact with, or otherwise be associated with the IAM component 138.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like. The policy management service 902E may receive the policy data from the admin device 128, and generate or determine policies.

The service provider network 102 can additionally maintain other services 902F based, at least in part, on the needs of its customers. For instance, the service provider network 102 can maintain a deployment service 902B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments.

Figure 10:
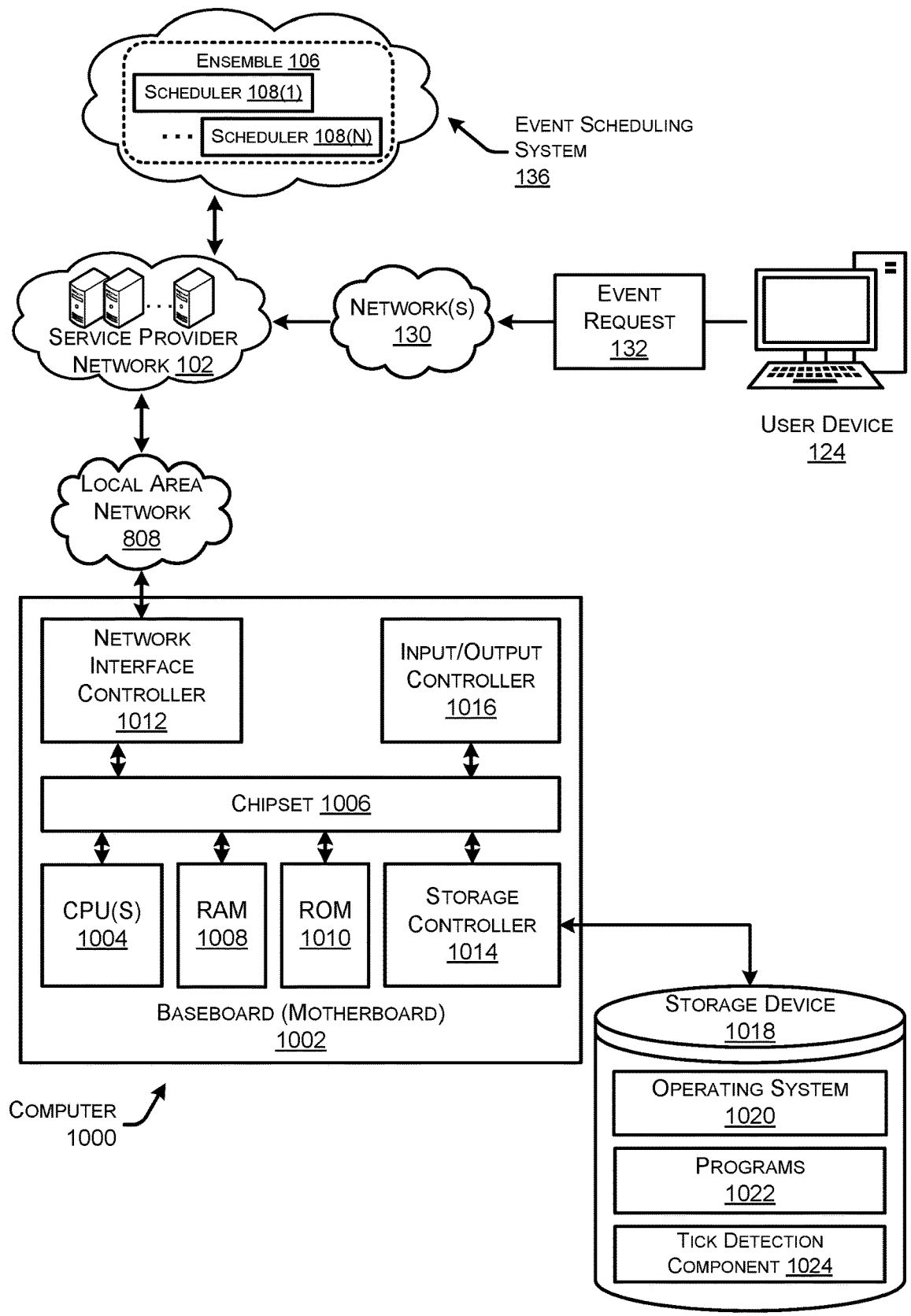
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 808. The chipset 1006 can include functionality for providing network connectivity through a NIC 1012, such as a gigabit Ethernet adapter. The NIC 1012 is capable of connecting the computer 1000 to other computing devices over the network 808 (or 130). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., event scheduling system 136), and data, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As illustrated in FIG. 10, the service provider network 102 may receive, at a web-based console 134 and over the network(s) 130, an event request 132 from a user device 124. The service provider network 102 may provide the event request 132, or data included therein, to the event scheduling system 136. The event scheduling system 136 may include or be associated with the ensemble 106 of schedulers 108. For instance, the event scheduling system 136 may determine a number of the schedulers 108 for the event requests 132 according to the techniques described herein, and group the number of schedulers 108 into an ensemble 106 to generate ticks as a group for the event 112, as described herein.

As the ticks are generated, the ticks may be provided over the network(s) 130, and/or the LAN 808, to the computer 1000. The computer 1000 may store, in the storage device 1018, a tick detection component 1024 comprising code to detect, from amongst the "N" number of ticks 110, a selected tick within the threshold period of time from the desired time. For instance, the tick detection component 1024 may include the pseudo code described with reference to FIG. 2, and/or any other code usable to select a tick 110 within the threshold period of time. the computer 1000 may then provide the selected tick to a load balancing server, and/or may comprise a load balancing server, that causes the event 112 to occur (e.g., executing a workflow or process for managed, distrusted resources of a service provider network 102).

Generally, the service provide network 102, and/or its associated services and components, may include computer-readable media that stores computer-executable instructions that, when executed by one or more processors, cause the one or more processors to perform the various operations and techniques described herein. As described herein, computer-readable media may include volatile and nonvolatile memory, removable and non-removable media implemented in any method or technology for storage of information, such as computer-readable instructions, data structures, program component, or other data. Such computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media may be implemented as computer-readable storage media ("CRSM"), which may be any available physical media accessible by the processor(s) to execute instructions stored on the computer-readable media. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

As used herein, a processor, such as processor(s), may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

In some examples, the devices and/or servers described herein may be configured to send and receive data over various types of networks, such as the BLE network as well as a WAN network. For instance, the user device 124 may be configured to send and receive data with the service provider network 102 over the network(s) 130, which may include wireless wide area networks (WWANs), such as 3G networks, 4G networks, 4G LTE networks, and so forth. While illustrated as being a WAN network 130, the network 130 may alternatively be any other type of network configured to send and receive data between computing devices, such as Personal Area Networks (PANs), Local Area Networks (LANs), Campus Area Networks (CANs), Metropolitan Area Networks (MANs), Broadband Global Area Networks (BGANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. In some examples, the network 130 may represent an array of wired networks, wireless networks (e.g., WiFi), or combinations thereof.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
    one or more processors; and
    one or more computer-readable media storing computer-executable instructions that, when executed by the one or more processors, cause the one or more processors to:
        receive, from a user device registered with a service provider network, a scheduling request to schedule an event to occur at a first time, the event being associated with a distributed service provided by the service provider network;
        determine, based on a maximum jitter delay representing a largest possible time delay caused by jitter between when event schedulers are scheduled to execute to generate a tick and when the event schedulers actually generate a tick, a second time at which to schedule the event schedulers to execute, the second time being prior to the first time;
        determine, based on a value indicating a probabilistic distribution of ticks of the event schedulers during the maximum jitter delay, a number of event schedulers to schedule for execution at the second time such that at least one of the event schedulers generates a tick within a threshold period of time from the first time;
        schedule the number of event schedulers to execute at the second time to generate respective ticks;
        execute, at the second time, each of the number of event schedulers to generate the respective ticks for the event at the second time;
        detect a tick by one of the event schedulers within the threshold period of time from the first time; and
        cause the event to occur based at least in part on the tick by the one of the event schedulers being within the threshold period of time from the first time.

2. The system of claim 1, comprising further computer-executable instructions that cause the one or more processors to:
    receive input indicating a confidence level that at least one of the event schedulers ticks within the threshold period of time from the first time,
    wherein the number of event schedulers is further determined based at least in part on the confidence level.

3. The system of claim 1, comprising further computer-executable instructions that cause the one or more processors to:
    based at least in part on detecting the tick within the threshold period of time from the first time, write an indication of the tick occurring at the first time to a distributed storage location atomically such that subsequent ticks from event schedulers do not cause the event to occur.

4. The system of claim 1, wherein:
    the event schedulers are configured to be scheduled at predefined times determined based at least in part on the maximum jitter delay;
    the first time at which the event is scheduled to occur is between a first predefined time and a second predefined time, wherein the first predefined time is spaced from the second predefined time based at least in part on the maximum jitter delay; and
    scheduling the number of event schedulers to execute at the second time to generate respective ticks comprises scheduling the number of event schedulers to execute at the first predefined time.

5. A computer-implemented method comprising:
    receiving an indication of a first time at which to schedule an event to occur, the event being associated with distributed computing resources provided by a service provider network;
    determining, based at least in part on a maximum jitter delay associated with event schedulers, a second time at which to schedule the event schedulers to execute, the maximum jitter delay representing a largest possible time delay caused by jitter between when the event schedulers are scheduled to execute to generate a tick and when the event schedulers actually generate a tick;
    determining, based at least in part on a value indicating a probabilistic distribution of ticks of the event schedulers during the maximum jitter delay, a number of event schedulers to schedule at the second time such that at least one of the event schedulers generates a tick within a threshold period of time from the first time;
    scheduling the number of the event schedulers to execute at the second time to generate respective ticks;
    determining that an event scheduler of the event schedulers generated a tick within the threshold period of time from the first time; and
    causing the event to occur based at least in part on the tick.

6. The computer-implemented method of claim 5, further comprising:
    receiving, from at least one of a user device or an admin device associated with the service provider network, a scheduling request to schedule the event to occur at the first time.

7. The computer-implemented method of claim 5, wherein:

the event schedulers are configured to be scheduled to execute at predefined times that are defined based at least in part on the largest possible time delay caused by the maximum jitter delay; and determining the second time at which to schedule the event comprises determining a predefined time that is prior to the first time.

8. The computer-implemented method of claim 5, further comprising, based at least in part on the event scheduler generated a tick within the threshold period of time from the first time, write an indication of the tick occurring at the first time to a distributed storage location atomically such that subsequent ticks from event schedulers do not cause the event to occur.

9. The computer-implemented method of claim 5, further comprising:

receiving input indicating a confidence level that at least one of the event schedulers ticks within the threshold period of time from the first time, and wherein the number of event schedulers is determined based at least in part on the confidence level.

10. The computer-implemented method of claim 5, further comprising receiving input from a user device associated with the distributed computing resources indicating the threshold period of time.

11. The computer-implemented method of claim 5, wherein determining that the event scheduler generated the tick within the threshold period of time from the first time comprises determining that a third time at which the tick was generated is greater than the first time minus the threshold period of time.

12. A system comprising:

one or more processors; and one or more computer-readable media storing computer-executable instructions that, when executed by the one or more processors, cause the one or more processors to:

determine a first time at which to schedule an event to occur, the event being associated with distributed computing resources;

determine, based at least in part on a maximum jitter delay associated with event schedulers, a second time at which to schedule the event schedulers to execute, the maximum jitter delay representing a largest possible time delay caused by jitter between when the event schedulers are scheduled to execute to generate a tick and when the event schedulers actually generate a tick;

determine, based at least in part on a value indicating a probabilistic distribution of ticks of the event schedulers during the maximum jitter delay, a number of multiple event schedulers to execute to generate ticks, the multiple event schedulers including a first event scheduler and a second event scheduler;

cause the first event scheduler and second event scheduler to execute at a second time;

determine that the first event scheduler generated a tick within a threshold period of time from the first time; and cause the event to occur based at least in part on the tick.

13. The system of claim 12, wherein the multiple event schedulers are configured to be scheduled to execute at predefined times that are defined based at least in part on the largest possible time delay caused by jitter, comprising further instructions that, when executed by the one or more processors, cause the one or more processors to:

determine the second time at which to schedule the event based at least in part on a predefined time that is prior to the first time.

14. The system of claim 12, comprising further instructions that, when executed by the one or more processors, cause the one or more processors to, based at least in part on the first event scheduler generating the tick within the threshold period of time from the first time, write an indication of the tick occurring at the first time to a distributed storage location atomically such that subsequent ticks from the multiple event schedulers do not cause the event to occur.

15. The system of claim 12, comprising further instructions that, when executed by the one or more processors, cause the one or more processors to:

receive input indicating a confidence level that at least one of the multiple event schedulers ticks within the threshold period of time from the first time, and wherein a number of the multiple event schedulers is determined based at least in part on the confidence level.

16. The system of claim 12, wherein determining that the first event scheduler generated the tick within the threshold period of time from the first time comprises determining that a third time at which the tick was generated is greater than the first time minus the threshold period of time.

17. The system of claim 12, comprising further instructions that, when executed by the one or more processors, cause the one or more processors to receive input from a user device associated with the distributed computing resources indicating the threshold period of time.

18. The computer-implemented method of claim 5, wherein the value indicating the probabilistic distribution of ticks indicates a substantially uniform distribution of ticks.

* * * * *